(12) United States Patent
Kim et al.

(10) Patent No.: US 9,338,630 B2
(45) Date of Patent: *May 10, 2016

(54) CONFIGURABLE PRICE MATRIX FOR MOBILE BILLING AT A BILLING SERVER

(71) Applicant: BOKU, INC., San Francisco, CA (US)

(72) Inventors: Jang Kim, San Francisco, CA (US); Yanting Li, Sunnyvale, CA (US); Daniel Keegan Flanigan, San Francisco, CA (US); Wesley D. Mateo, San Francisco, CA (US)

(73) Assignee: Boku, Inc., San Francisco, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/930,767

(22) Filed: Jun. 28, 2013

(65) Prior Publication Data

US 2015/0004933 A1     Jan. 1, 2015

(51) Int. Cl.
*G06Q 40/00* (2012.01)
*H04W 4/24* (2009.01)
*G06Q 30/04* (2012.01)
*H04M 15/00* (2006.01)

(52) U.S. Cl.
CPC .............. *H04W 4/24* (2013.01); *G06Q 30/04* (2013.01); *H04M 15/68* (2013.01); *H04M 15/8033* (2013.01)

(58) Field of Classification Search
USPC .......................................... 705/35, 38, 39, 40
See application file for complete search history.

(56) References Cited

U.S. PATENT DOCUMENTS

| | | | | |
|---|---|---|---|---|
| 8,577,795 B2 * | 11/2013 | Clubb | .................. | G06Q 20/105 705/39 |
| 2006/0041505 A1 * | 2/2006 | Enyart | .................. | G06Q 20/102 705/40 |
| 2007/0295803 A1 * | 12/2007 | Levine | .................. | G06Q 20/04 235/379 |
| 2012/0202893 A1 * | 8/2012 | Nomura | .................. | A61K 8/064 514/772 |
| 2012/0209731 A1 | 8/2012 | Conlin et al. | | |

\* cited by examiner

*Primary Examiner* — Lalita M Hamilton
(74) *Attorney, Agent, or Firm* — Stephen M. De Klerk (57) ABSTRACT

A method of processing transactions is described. A pricing matrix is configured on a billing server. The pricing matrix has a set of cells, each cells corresponding to an intersection between a respective country and a respective target price. The merchant server downloads the pricing matrix periodically from the billing server. The merchant server determines a country of a consumer mobile phone and displays price points corresponding to the country within a mobile phone application. When the consumer selects one of the price points a transaction is processed between the consumer mobile phone, the billing server and a carrier server aligned with the billing server.

11 Claims, 11 Drawing Sheets

| Country | Reference | Australia | Finland | Germany | Indonesia | Spain | United Kingdom | United States of America |
|---|---|---|---|---|---|---|---|---|
| Currency | USD | AUD | EUR | EUR | IDR | EUR | GBP | USD |
| Language | | English | Finnish | German | Indonesian | Spanish | English | English |
| Row-Ref 0 | | AUD 0.00 | EUR 0.00 | EUR 0.00 | IDR 0 | EUR 0.00 | GBP 0.00 | USD 0.00 |
| Target Price 1 | USD0.00 | Price AUD 5.00 | Price EUR 2.00 | Price EUR 2.00 | Price IDR 5000 | Price EUR 1.77 | Price GBP 1.50 | Price USD 2.00 |
| Show/Hide | | | | | | | | |
| Row-Ref 1 | | AUD 0.00 | EUR 0.00 | EUR 0.00 | IDR 0 | EUR 0.00 | GBP 0.00 | USD 0.00 |
| Target Price 2 | USD0.00 | Price AUD 10.00* | Price EUR 4.00 | Price EUR 5.00 | Price IDR 10000 | Price EUR 4.72 | Price GBP 5.00 | Price USD 5.00 |
| Show/Hide | | | | | | | | |
| Row-Ref 2 | | AUD 0.00 | EUR 0.00 | EUR 0.00 | IDR 0 | EUR 0.00 | GBP 0.00 | USD 0.00 |
| Target Price 3 | USD0.00 | Price AUD 15.00* | Price EUR 10.00* | Price EUR 10.00 | Price IDR 15000 | Price EUR 7.08 | Price GBP 10.00 | Price USD 9.99 |
| Show/Hide | | | | | | | | |
| Row-Ref 3 | | AUD 0.00 | EUR 0.00 | EUR 0.00 | IDR 0 | EUR 0.00 | GBP 0.00 | USD 0.00 |
| Target Price 4 | USD0.00 | Price AUD 20.00* | Price EUR 14.00* | Price EUR 20.00 | Price Disable | Price Disable | Price GBP 20.00* | Price USD 19.99 |
| Show/Hide | | | | | | | | |
| Row-Ref 4 | | AUD 0.00 | EUR 0.00 | EUR 0.00 | IDR 0 | EUR 0.00 | GBP 0.00 | USD 0.00 |
| Target Price 5 | USD0.00 | Price AUD 25.00* | Price EUR 20.00* | Price EUR 30.00 | Price Disable | Price Disable | Price GBP 20.00* | Price USD 19.99 |
| Show/Hide | | | | | | | | |

CONFIGURABLE PRICE MATRIX FOR MOBILE BILLING AT A BILLING SERVER

BACKGROUND OF THE INVENTION

1). Field of the Invention

This invention relates to a system and method for processing transactions.

2). Discussion of Related Art

Merchant servers often have stores allowing consumers to use browsers within mobile devices to select goods, virtual goods or services from the merchant server and then to make a purchase from the merchant server. The consumer may be asked to select payment options, such as credit card details, payment via an account having a stored value, or have a charge placed on their phone bill. If the consumer selects their phone bill, the merchant server transmits a payment authorization to a billing server. The billing server is aligned with one or more carrier servers and places a charge on a phone bill of the consumer at the carrier server. There are methods that exist in the art for the billing server to determine a phone number and/or a carrier corresponding to a consumer mobile phone of the consumer.

The carriers in different countries have different requirement with respect to currency and price points that are supported. In addition, a merchant server may have a number of different options available for purchase at different target prices. For example, a merchant may sell 100 points, 200 points or 300 points. The different levels of service sold by the merchant server may not be in exact multiples due to carrier restrictions with respect to price points. Alternatively, a merchant may wish to provide different levels of service at different price points that are optically more favorable (e.g. $1.99, $2.99 and $3.99) or that factor in discounts for larger purchases.

SUMMARY OF THE INVENTION

The invention provides a method of processing transactions with a billing server, including receiving, at the billing server, a configuration input from at least one merchant computer, the configuration input configuring a pricing matrix of countries and target prices, the pricing matrix having a set of cells, each cell corresponding to an intersection between a respective country and a respective target price, such that each country has a subset of the set of cells, the subset having different price points, storing, with the billing server, the pricing matrix, transmitting, with the billing server, the pricing matrix to the merchant computer in response to the pricing call, receiving, with the billing server, a payment authorization based on the price point, determining, with the billing server, a carrier server based on the payment authorization, sending, with the billing server, a charge request to a carrier server to charge an account on the carrier server corresponding to the phone number and transmitting, with the billing server, a transaction callback notification to the merchant computer.

The invention also provides a non-transitory computer-readable medium having stored thereon a set of instructions wherein, when executed by a processor of a computer performs a method of processing transactions with a billing server, including configuring, with at least one merchant computer, a pricing matrix of countries and target prices, the pricing matrix having a set of cells, each cell corresponding to an intersection between a respective country and a respective target price, such that each country has a subset of the set of cells, the subset having different price points, storing, with at least one merchant computer, the pricing matrix, receiving, with at least one merchant computer, a transaction request from a consumer device, identifying, with at least one merchant computer, a country of the consumer device based on the payment request, matching, with at least one merchant computer, the country of the consumer device with a country in the pricing matrix, determining, with at least one merchant computer, at least one price point for the country that has been matched in the pricing matrix, transmitting, with at least one merchant computer, the price point that has been extracted to the consumer device, allowing a user of the consumer device to make a purchase and receiving, with at least one merchant computer, a transaction callback notification from a billing server in response to the transmission of the price point.

The invention further provides a billing server including a processor, a computer-readable medium connected to the processor and a set of instructions on the computer-readable medium and executable by the processor. The set of instructions includes a transaction application programmable interface management module executing the steps of receiving a configuration input from at least one merchant computer, the configuration input configuring a pricing matrix of countries and target prices, the pricing matrix having a set of cells, each cell corresponding to an intersection between a respective country and a respective target price, such that each country has a subset of the set of cells, the subset having different price points, storing the pricing matrix, transmitting the pricing matrix to the merchant computer in response to the pricing call, and a carrier billing module executing the steps of receiving, with the billing server, a payment authorization based on the price point determining, with the billing server, a carrier server based on the payment authorization sending, with the billing server, a charge request to a carrier server to charge an account on the carrier server corresponding to the phone number and transmitting, with the billing server, a transaction callback notification to the merchant computer.

BRIEF DESCRIPTION OF THE DRAWINGS

The invention is further described by way of example with reference to the accompanying drawings, wherein.

DETAILED DESCRIPTION OF THE INVENTION

Figure 1:
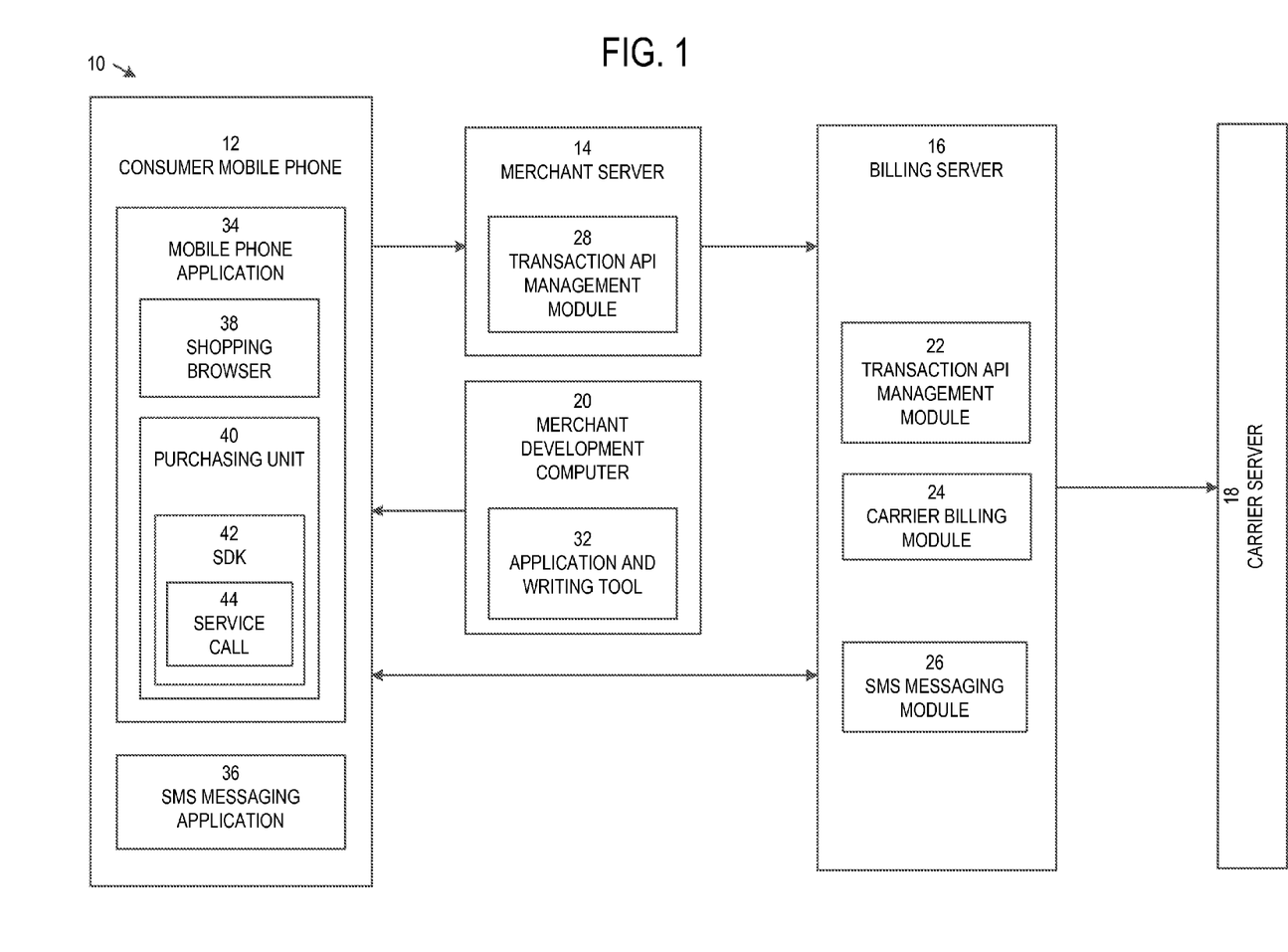
FIG. 1 is a block diagram of a system for processing transactions according to an embodiment of the invention.

FIG. 1 of the accompanying drawings illustrates a transaction processing system, according to an embodiment of the invention, including a consumer mobile phone 12, a merchant server 14, a billing server 16, a carrier server 18 and a merchant development computer 20. The consumer mobile phone 12 is connected over the Internet to the merchant server 14. Similarly, the merchant server 14 is connected over the Internet to the billing server 16 and the billing server 16 is connected over the Internet to the carrier server 18. The merchant development computer 20 is also connected over the Internet to the consumer mobile phone 12. Furthermore, the billing server 16 and the consumer mobile phone 12 are connected to one another over an SMS network.

The billing server 16 includes a transaction application programmable interface (API) management module 22, a carrier billing module 24 and a Short Message Service (SMS) messaging module 26. The merchant server 14 includes a transaction API management module 28. The merchant development computer 20 includes an application writing and publishing tool 32. The consumer mobile phone 12 includes a mobile phone application 34 and an SMS messaging application 36. The mobile phone application 34 includes a shopping browser 38 and a purchasing unit 40. The purchasing unit 40 includes a software development kit (SDK) 42. The SDK 42 includes a service call 44.

The application writing and publishing tool 32 is used for developing the mobile phone application 34. The mobile phone application 34 is used to shop at a store at the merchant server 14 and for processing payments through the billing server 16. The billing server 16 then places a charge corresponding to a phone number of the consumer mobile phone 12 at the carrier server 18.

Figure 2:
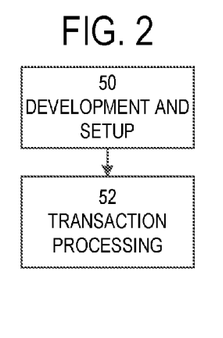
FIG. 2 is a high level flow chart for processing transactions according to an embodiment of the invention.

As illustrated in FIG. 2 at 50, development and setup is first completed. The development and setup comprises configuring of a pricing matrix and associated functioning and the writing and development of the mobile phone application 34. At 52, a transaction is processed using the mobile phone application 34 and the pricing matrix together with associated functioning.

Figure 3:
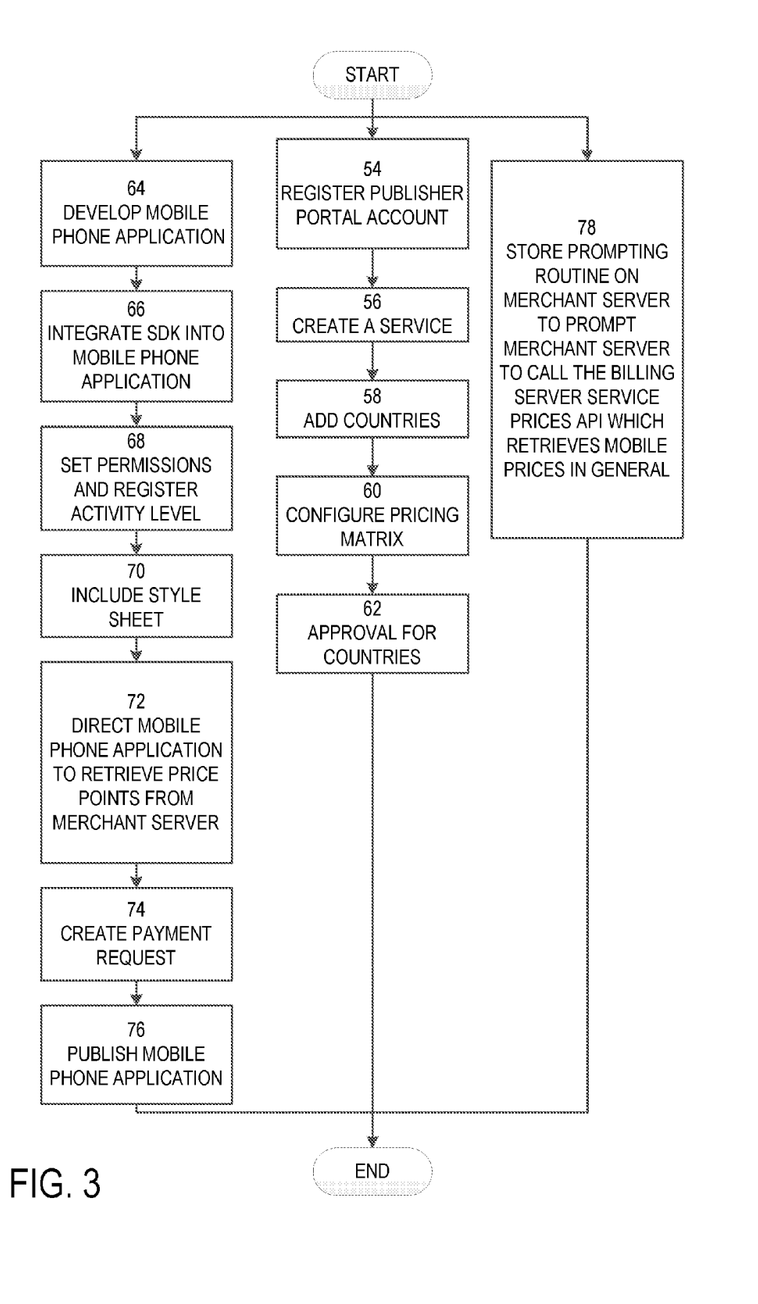
FIG. 3 is a flow chart illustrating a development and setup phase in FIG. 2.

FIG. 3 illustrates the development phase at 50 in FIG. 2 in more detail. The development illustrated in FIG. 3 is primarily carried out by the merchant development computer 20 in FIG. 1. At 54, the merchant development computer 20 is used to register a publisher portal account at the billing server 16. The billing server 16 then registers the publisher portal account for the merchant development computer 20.

At 56, the merchant development computer 20 is used to create a service in the account. The billing server 16 then creates the service in the account on the billing server 16.

At 58, the merchant development computer 20 is used for adding countries for a pricing matrix to the service. The billing server 16 receives the countries of the pricing matrix as part of a configuration input from the merchant server 14 and adds the countries of the pricing matrix to the service and allows for an operator at the merchant development computer 20 to configure the pricing matrix on the billing server 16.

At 60, the merchant development computer 20 is used for configuring a pricing matrix on the billing server 16. The billing server 16 receives a configuration input from the merchant development computer 20.

At 62, the billing server 16 approves the countries of the pricing matrix.

Steps 64 through 76 are primarily carried out by the application writing and publishing tool 32 of the merchant development computer 20 in FIG. 1. At 64, the application writing and publishing tool 32 is used to write a mobile phone application that eventually becomes the mobile phone application 34 residing on the consumer mobile phone 12.

At 66, the application writing and publishing tool 32 is used to integrate the SDK 42 into the purchasing unit 40 of the mobile phone application 34. At 68, the application writing and publishing tool 32 is used to set permissions and registering an activity level of the SDK 42. By adding these permissions, when the user downloads the application, the application will request permission to receive and send SMS, which is required for the SDK 42 to successfully process transactions. At 70, the application writing and publishing tool 32 is used to include a style sheet into the SDK 42.

At 72, the application writing and publishing tool 32 is used to direct the mobile phone application 34 to retrieve price points from the merchant server 14. At 74, the application writing and publishing tool 32 is used to create a payment request that directs the SDK 42 to make a payment request via the merchant server 14 to the billing server 16. At 76, the application writing and publishing tool 32 is used to publish the mobile phone application 34 to a consumer device, in this case the consumer mobile phone 12.

At 78, a developer at a merchant also stores a prompting routine on the merchant server 14. The prompting routine prompts the merchant server 14 to call a billing service application programmable interface (API) which retrieves price points from the billing server 16. The merchant server 14 then retrieves the price points from the billing server 16. The price points that are retrieved are general price points that can be retrieved at longer intervals that do not necessarily coincide with purchasing intervals. For example, the price points that are retrieved in general can be retrieved on a daily basis, a weekly basis or a monthly basis.

The price points depend on the type of items that are being sold. There are primarily two types of items available for purchase in a mobile application, which are:

Virtual currency (divisible into smaller units)

Virtual good (not divisible into smaller units)

Virtual currency packages are divisible and therefore can be adjusted to match up with fixed price points. For example, if 1 gold coin=USD $0.01 (rounded to the nearest 5 coins), may result in price point packages as illustrated in Table 1:

TABLE 1

| Country | Currency | Price Point | Converted Price | Package |
| --- | --- | --- | --- | --- |
| Germany (DE) | EUR | €0.99 | US $1.44 | 145 gold coins |
| United Kingdom (GB) | GBP | £1.00 | US $1.64 | 165 gold coins |
| United States (US) | USD | $1.00 | US $1.00 | 100 gold coins |
| United States (US) | USD | $2.00 | US $2.00 | 200 gold coins |

When selling virtual currency, selecting up to five price points for each country are advisable to ensure that every user around the world sees mobile price points that are available to them.

Virtual goods (e.g. a "magic sword" or a "castle upgrade") are more cumbersome to price because they cannot be partially awarded. Therefore a merchant has to determine a price range that they are willing to offer for the product. If there is no price point available in a given country within the range, the merchant will disable the mobile payment option for the product in that country. For example, if the merchant is willing to accept a price range between USD $0.75 to $1.25 for a "magic sword", Table 2 illustrates how the merchant will select what prices to offer in each market.

TABLE 2

| Country | Currency | Price Point | Converted Price | Market disable Reason |
|---|---|---|---|---|
| France (FR) | EUR | €1.00 disabled | US $1.40 | Lowest offered price point is €1.00 which is too |
| Spain (ES) | EUR | €1.77 disabled | US $2.49 | Lowest offered price point is €1.77 which is too |
| Sweden (SE) | SEK | 5.00 kr | US $0.79 | |
| United Kingdom (UK) | GBP | £0.75 | US $1.21 | |
| United States (US) | USD | $1.00 | US $1.00 | |

Figure 4:
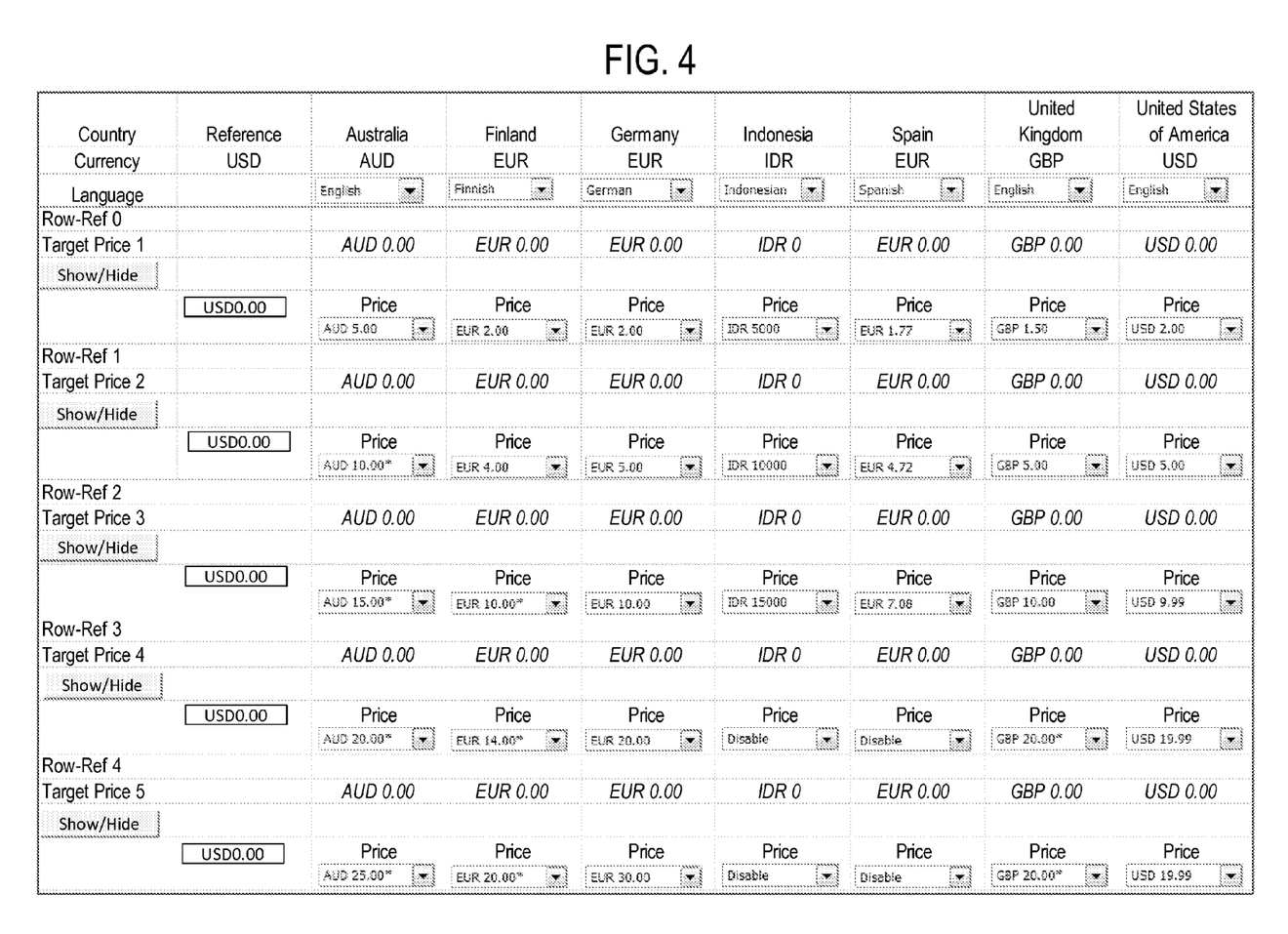
FIG. 4 is a screen shot of a pricing matrix that is used in the invention.

FIG. 4 illustrates a pricing configuration that is configurable by the operator of the merchant development computer 20 on the billing server 16. The pricing matrix includes a number of countries (Australia, Finland, Germany, Indonesia, Spain, United Kingdom, United States of America) across the top. Each one of the countries was previously selected by the merchant development computer 20. The name of each country represents a respective column in the pricing matrix. The pricing matrix also includes a number of rows, each row representing a respective target price (Target Price 1, Target Price 2, Target Price 3, Target Price 4, Target Price 5). One target price (e.g. Target Price 2) will typically correspond to the same item, virtual item or service that is being sold. The pricing matrix has a set of cells (e.g. the cell containing GPB 10.00) corresponding to an intersection between a respective country (e.g. United Kingdom) and a respective target price (e.g. Target Price 3). As such, each country (e.g. United Kingdom) has a subset (e.g. the subset of cells containing GPB 1.50, GPB 5.00, GPB 10.00, GPB 20.00, GPB 30.00) of the set of cells (all the cells). The subset has different price points (e.g. GPB 1.50, GPB 5.00, GPB 10.00, GPB 20.00, GPB 30.00).

What should also be noted is that at least one price point (e.g. GPB 10.00) for one of the countries (e.g. United Kingdom) differs from all price points (USD 2.00, USD 5.00, USD 9.99, USD 19.99, USD 24.99) of another country (United States of America). What should also be noted is that two different countries (e.g. United Kingdom and United States of America) are in different currencies (GPB and USD).

Other restrictions may also be provided depending on the country. Table 3 illustrates certain restrictions that are supported by respective countries.

TABLE 3

| COUNTRY | CODE | RESTRICTIONS |
|---|---|---|
| Czech Republic | CZ | Only O2 supported on price points Kč600.00 or lower. |
| France | FR | Only price points €4.50 or lower are supported. |
| Italy | IT | All networks supported except Vodafone. |
| Philippines | PH | Only supports the following price points: Php20.00, Php40.00, Php60.00, Php100.00, Php200.00, Php300.00, Php400.00, Php500.00 |
| Romania | RO | Only price points €2.99 or lower are supported. |
| Russia | RU | Only PSMS price points 203.2руб or lower are supported. |
| USA | US | All networks supported except Verizon. |

As can be seen from Table 1, the price point for at least one country (e.g. Romania) is only supported below a predetermined amount (e.g. €2.99). The price points for at least one country (e.g. Philippines) are only supported for a set of predetermined amounts (e.g. Php20.00, Php40.00, Php60.00, Php100.00, Php200.00, Php300.00, Php400.00, Php500.00).

Once the pricing matrix of FIG. 4 is configured, the operator at the merchant development computer 20 then selects a button to store the pricing matrix on the billing server 16. The billing server 16 then stores the pricing matrix on the billing server 16.

Figure 5:
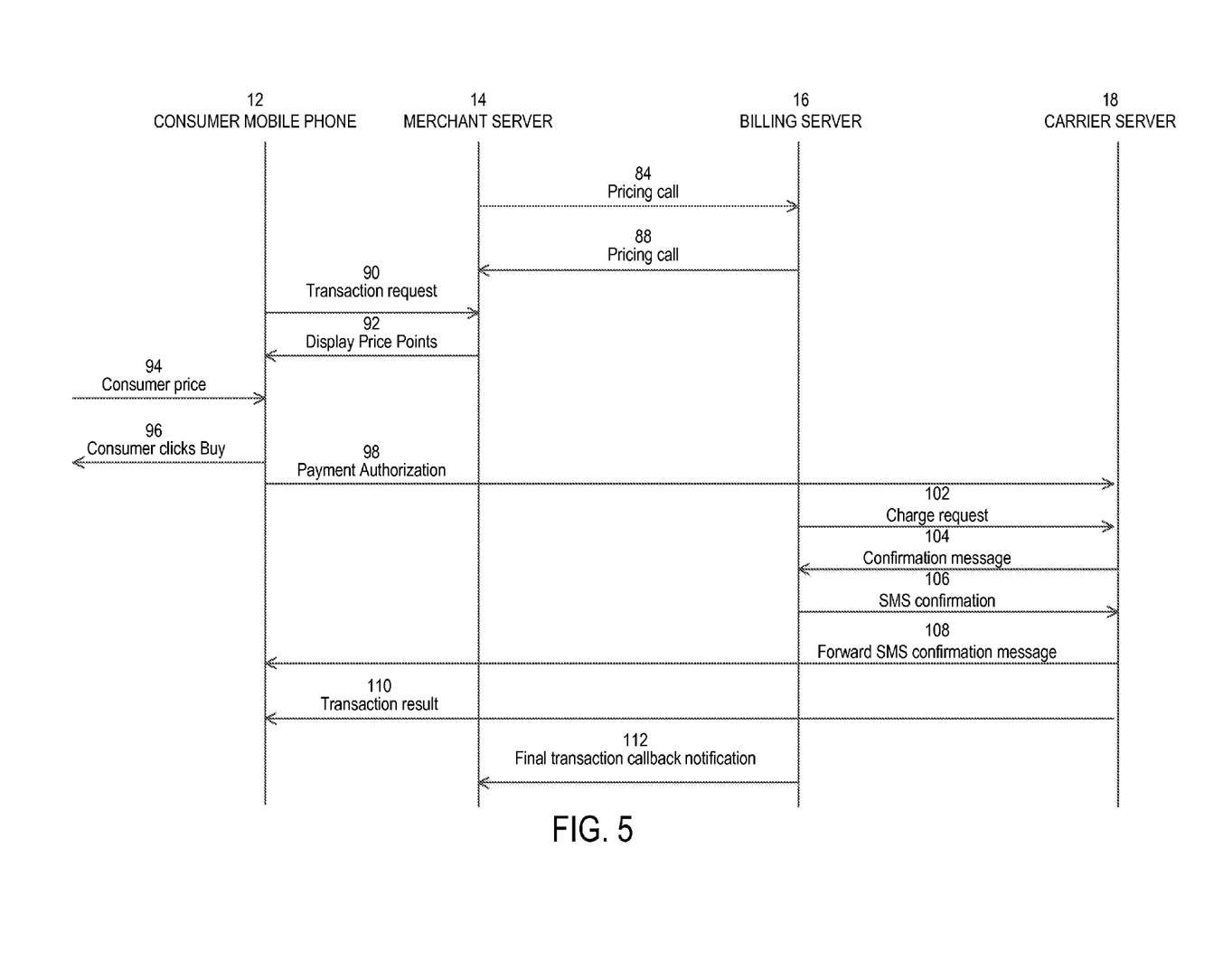
FIG. 5 is an interactive diagram illustrating transaction processing in FIG. 2.

FIG. 5 illustrates how the pricing matrix is maintained on the merchant server 14 and how a transaction is processed. At 84, the merchant server 14 is prompted by the routine stored at 78 in FIG. 3 to retrieve mobile prices in general. The mobile prices are in the form of the pricing matrix shown in FIG. 4. The pricing matrix in FIG. 4 is maintained by the billing server 16. The billing server 16 may from time to time modify the price points within the pricing matrix slightly. Because of small modifications in the price points, the merchant server 14 periodically makes the pricing call at 84 in FIG. 5 and the billing server 16 at 86 responds with price points, typically in the form of the pricing matrix of FIG. 4. The merchant server 14 may for example make a pricing call such as the pricing call 84 on a monthly or weekly basis. The price points in the pricing matrix are then stored on the merchant server 14 for purposes of processing transactions and remains static for all transactions until another pricing call such as the pricing call 84 is made and different price points are returned in a response similar to the response at 88.

The remainder of FIG. 5 illustrates one transaction that is executed based on the price point received at 88. As mentioned earlier, the shopping browser 38 in FIG. 1 is used by a consumer to shop within a store on the merchant server 14. At checkout, the consumer mobile phone 12 transmits a transaction request 90 to the merchant server 14. When the merchant server 14 receives the transaction request 90, the merchant server 14 identifies a country of the consumer mobile phone 12 based on the payment request. The payment request may for example include the country of the consumer mobile phone 12. Alternatively, the payment request may include a phone number of the consumer mobile phone 12 that is used in a lookup to determine a country corresponding to the phone number. Other methods are known in the art for determining a country of a consumer mobile phone 12. The merchant server 14 then matches the country of the consumer mobile phone 12 with a country in the pricing matrix. For example, if the country of the consumer mobile phone 12 is determined to be Spain, then the merchant server 14 matches the country of the consumer mobile phone 12 with the fifth column in FIG. 4 for Spain.

Figure 6:
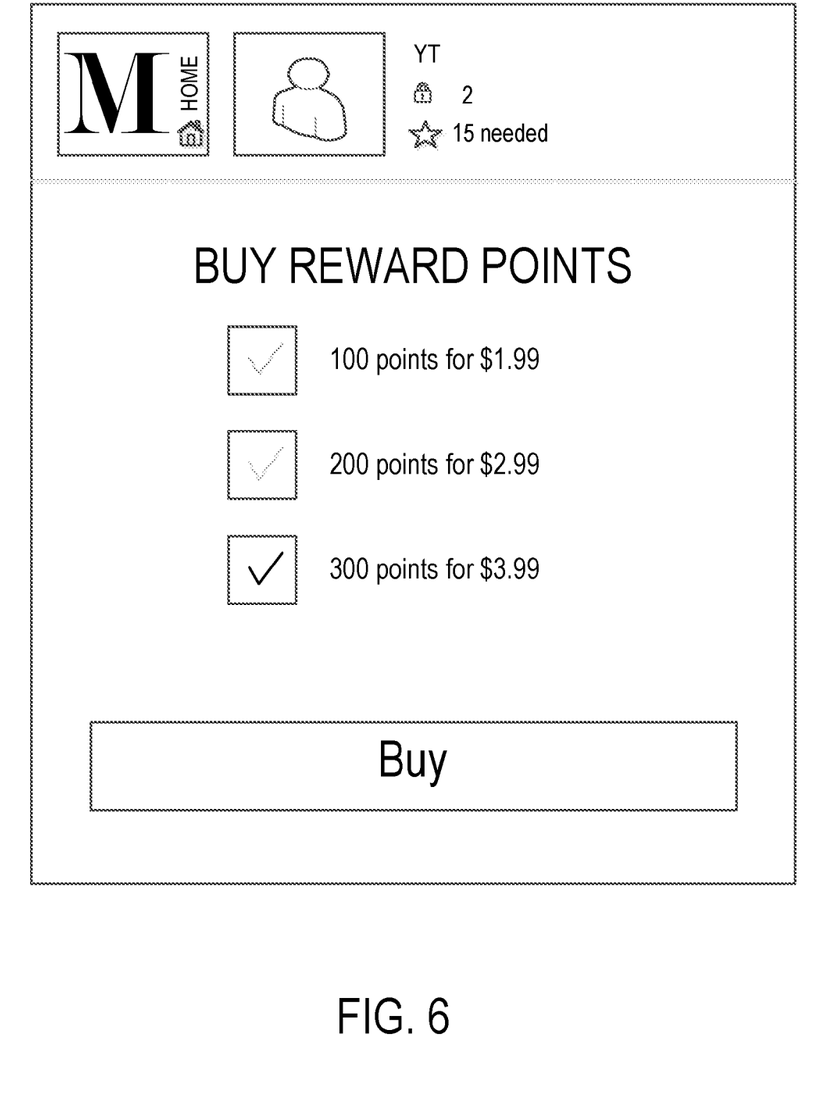
FIG. 6 is a screen shot of a purchasing unit of a mobile phone application, illustrating price points that are selectable by a consumer.
Figure 7:
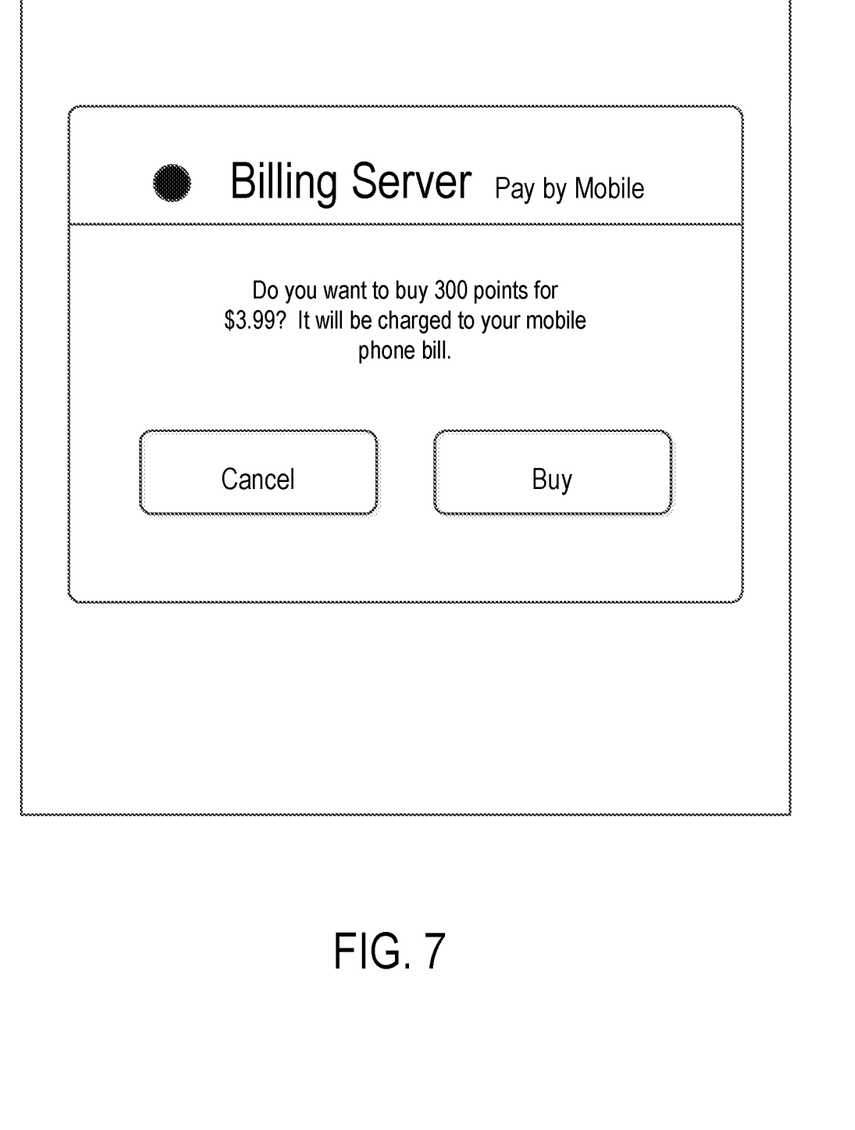
FIG. 7 is a view similar to FIG. 6 after the consumer has selected one of the price points.
Figure 8:
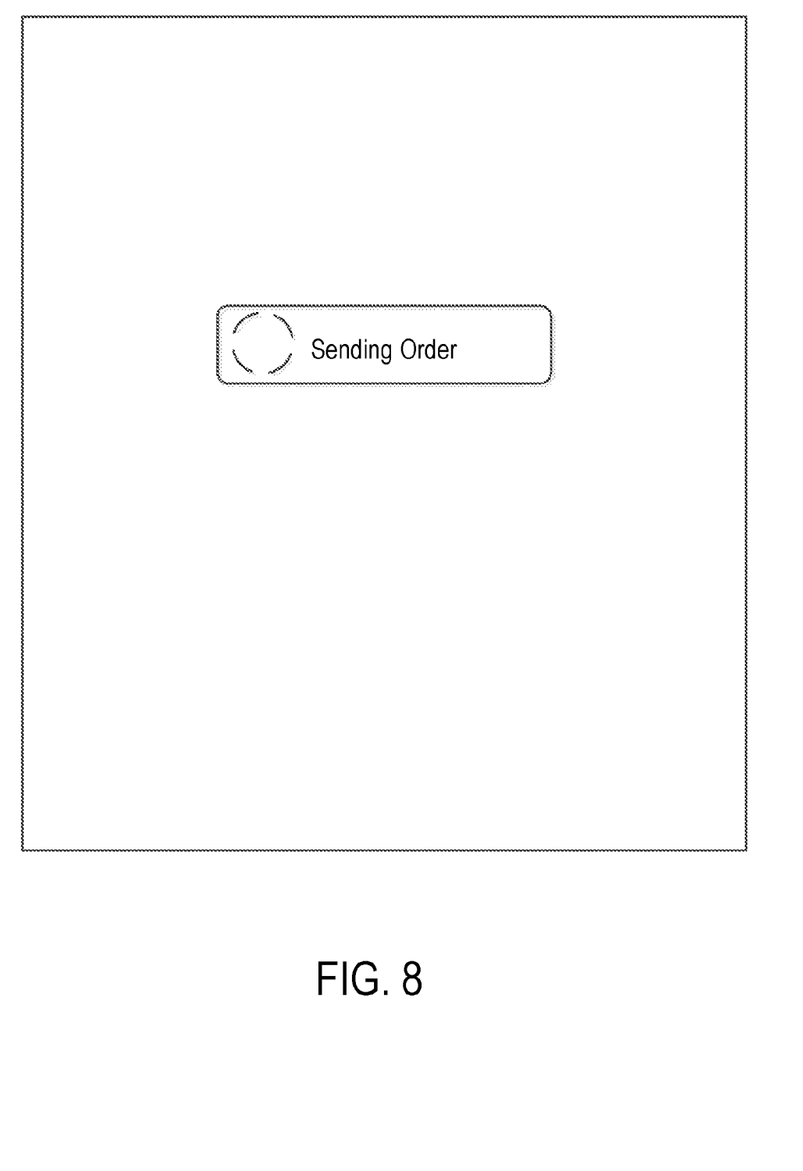
FIG. 8 is a view similar to FIG. 7 after the consumer has selected to purchase the item identified in FIG. 7.

At 92, the merchant server 14 responds to the transaction request received at 90 to transmit and display price points on the consumer mobile phone 12. FIG. 6 illustrates price points that are displayed on the consumer mobile phone 12 for three different levels. In the example, a consumer can buy multiples of 100 points for three different prices at three different price points. At 94 in FIG. 5, the consumer selects one of the price points on the consumer mobile phone 12. FIG. 7 shows a payment dialogue that is displayed on the mobile device when the consumer selects one of the options in FIG. 6. At 96, a payment dialogue is shown on the consumer mobile phone 12 and a message is transmitted to the billing server 16 to indicate that the consumer has selected a price point for purposes of making a purchase. At 96, the consumer selects one of the price points on the consumer mobile phone 12. FIG. 8 shows a payment dialogue that is displayed on the consumer mobile phone 12 after the consumer has selected "Buy" in FIG. 7. At 98, a payment dialogue is displayed on the consumer mobile phone 12 and a payment authorization is transmitted from the consumer mobile phone 12 to the carrier server 18. The carrier server 18 then at 100 forwards the payment authorization to the billing server 16. The payment authorization transmitted at 98 and 100 is typically transmitted to a short code of the billing server 16 via an SMS message. The consumer mobile phone 12 belongs to a network of the carrier server 18, which is why the payment authorization 98 reaches the carrier server 18 before reaching the billing server 16. The payment authorization transmitted at 100 includes the phone number of the consumer mobile phone 12, which is usually added on by the carrier server 18. The billing server 16 can thus identify the phone number of the consumer mobile phone 12. The billing server 16 can then determine both the phone number and the carrier of the consumer mobile phone 12.

At 102, the billing server 16 transmits a charge request to the carrier server 18 to charge an account on the carrier server 18 corresponding to the phone number. At 104, the carrier server 18 then attempts to place a charge on an account the carrier server 18 corresponding to the phone number. If the charge is successful, the carrier server 18 at 104 returns a confirmation message to the billing server 16 that the charge has been placed. The billing server 16 then at 106 transmits an SMS message to the carrier server 18 that includes the confirmation and the phone number of the consumer mobile phone 12. At 108, the carrier server 18 automatically forwards the SMS confirmation message to the consumer mobile phone 12. The SMS messaging application 36 in FIG. 1 is used for transmitting the payment authorization 98 and for receiving and displaying the payment the confirmation received at 108 in FIG. 5.

Figure 9:
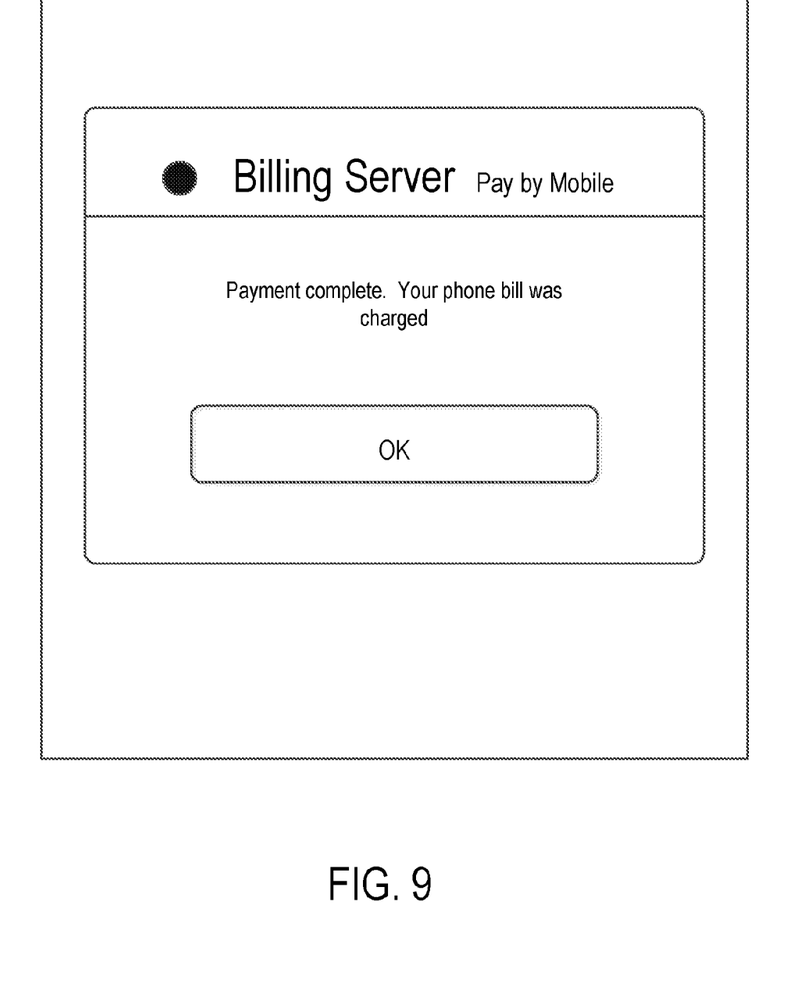
FIG. 9 is a view similar to FIG. 8 showing that a purchase has been completed.
Figure 10:
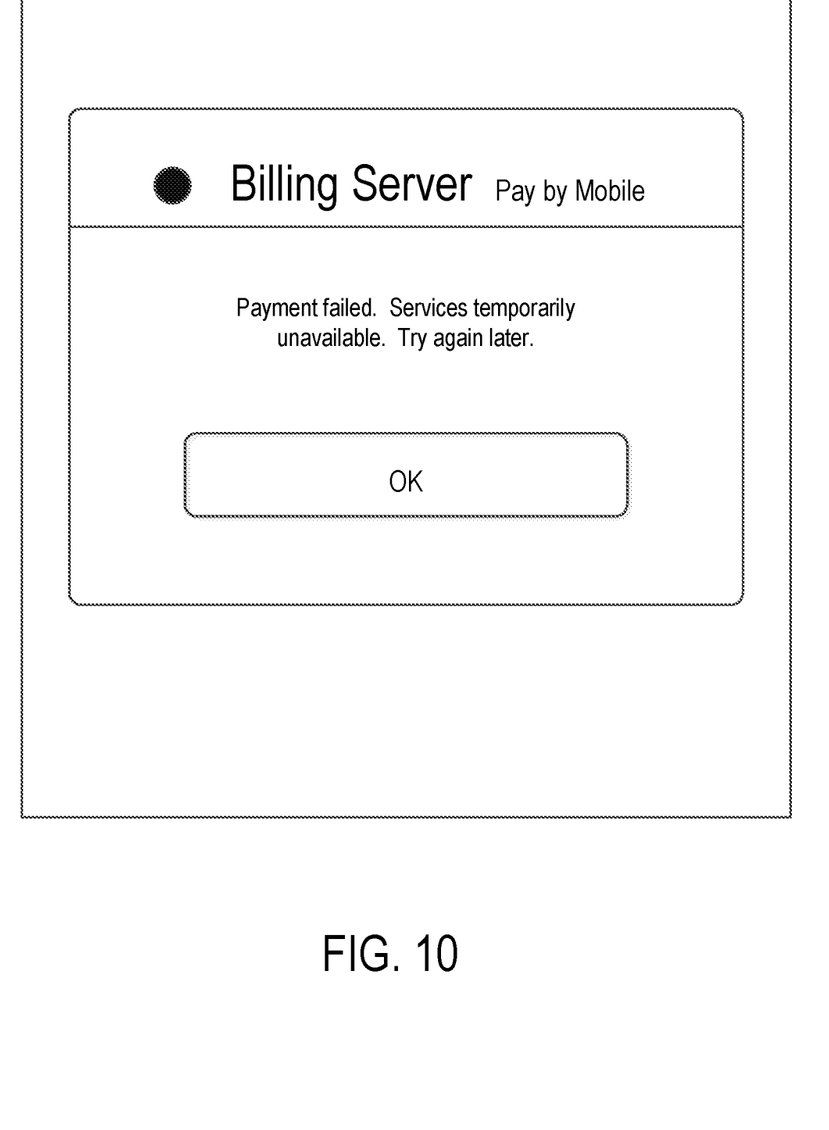
FIG. 10 is a view similar to FIG. 9 showing that the transaction could not be completed.

The billing server 16 at 110 displays the transaction results within the application of the consumer mobile phone 12. FIGS. 9 and 10 illustrate views that are displayed on the consumer mobile phone 12 respectively if the account on the carrier server 18 was successfully charged or if the account on the carrier server 18 was not charged because of temporary unavailability of services. The billing server 16 at 112 transmits a final transaction callback notification to the merchant server 14. The merchant server 14 then records the transaction as completed within an account for the consumer mobile phone 12 on the merchant server 14.

Figure 11:
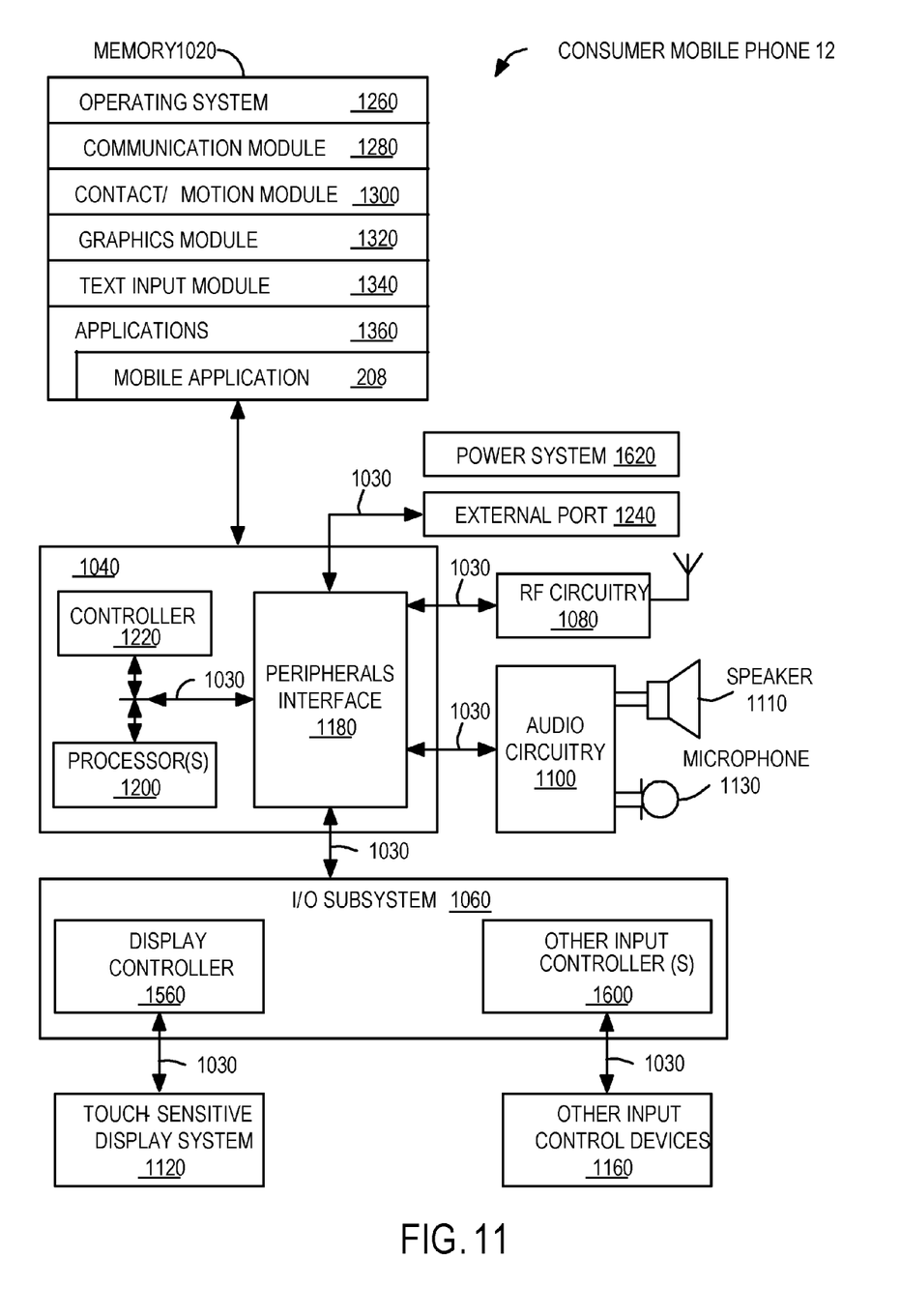
FIG. 11 is a block diagram of the consumer mobile phone illustrating SmartPhone features thereof.

FIG. 11 is a block diagram illustrating the consumer mobile phone 12, illustrating a touch-sensitive display 1120 or a "touch screen" for convenience. The consumer mobile phone 12 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 11 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the consumer mobile phone 12, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the consumer mobile phone 12 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the consumer mobile phone 12. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the consumer mobile phone 12, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the consumer mobile phone 12 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The consumer mobile phone 12 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the mobile application 208.

Figure 12:
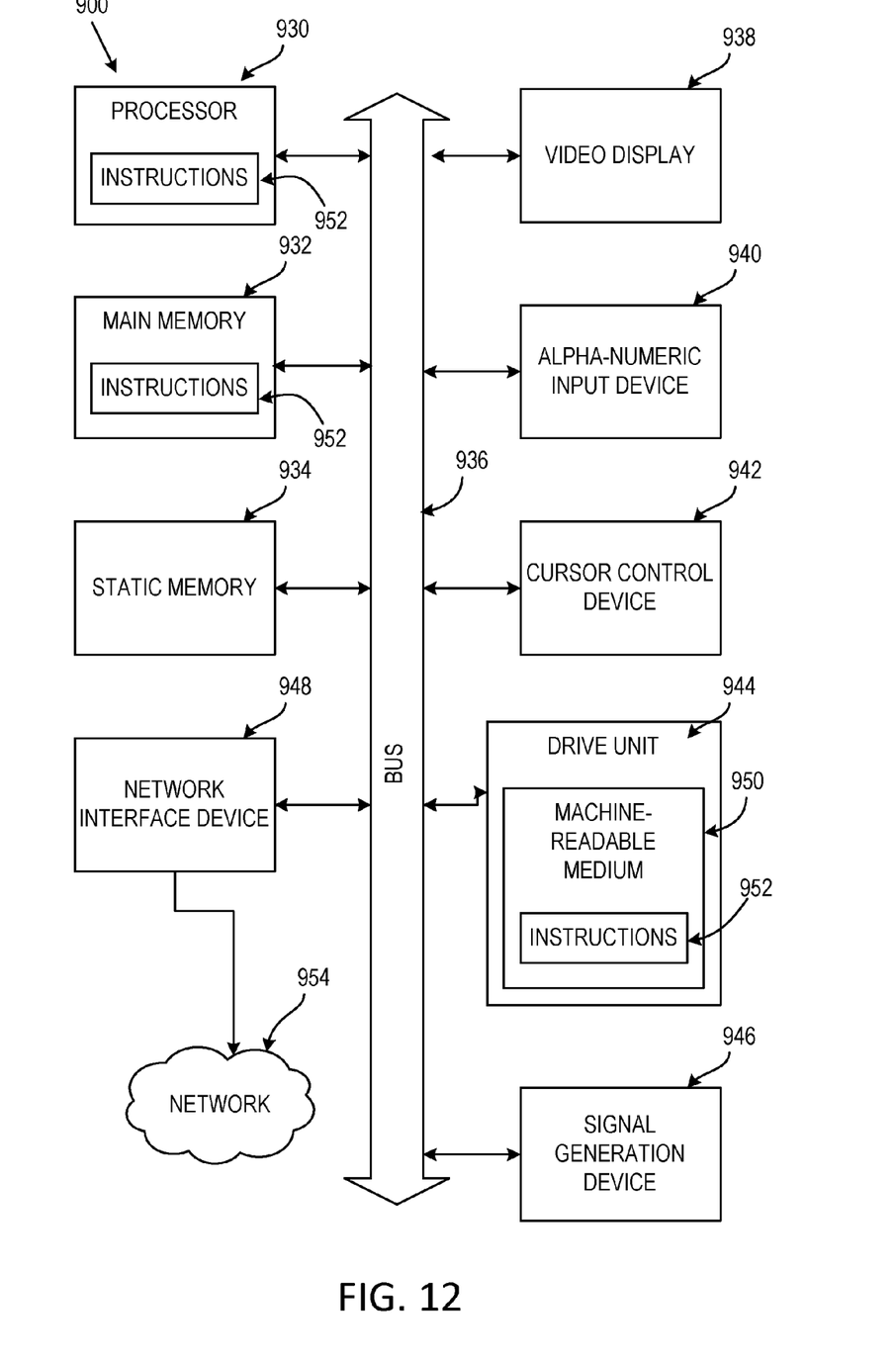
FIG. 12 is a block diagram of a machine in the form of a computer system forming part of the transaction processing system.

FIG. 12 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of processing transactions with a billing server, comprising:
    receiving, at the billing server, a configuration input from at least one merchant computer, the configuration input configuring a pricing matrix of countries and target prices, the pricing matrix having a set of cells, each cell corresponding to an intersection between a respective country and a respective target price, such that each country has a subset of the set of cells, the subset having a plurality of price points that are different from each other;
    storing, with the billing server, the pricing matrix;
    receiving, with the billing server, a pricing call from the merchant computer system;
    transmitting, with the billing server, the pricing matrix to the merchant computer in response to the pricing call;
    receiving, with the billing server, a payment authorization based on one of the price points;
    determining, with the billing server, a carrier server based on the payment authorization;
    sending, with the billing server, a charge request to the carrier server to charge an account on the carrier server corresponding to phone number; and
    transmitting, with the billing server, a transaction callback notification to the merchant computer.

2. The method of claim 1, further comprising:
    registering, with the billing server, a public portal account for the merchant computer on the billing server;
    creating, with the billing server, a service in the account; and
    adding, with the billing server, the countries at the pricing matrix to the service, wherein the pricing matrix is configured by the merchant computer on the billing server; and
    approving, with the billing server, the pricing service.

3. The method of claim 1, wherein at least one price point for one of the countries differs from all price points of another country.

4. The method of claim 1, wherein the price points for two different countries are in different currencies.

5. The method of claim 1, wherein the one target price has a plurality of price points associated with a plurality of countries.

6. The method of claim 1, wherein the price points for at least one country is only supported below a predetermined amount.

7. The method of claim 1, wherein the price points for at lone country are only supported for a set of predetermined amounts.

8. The method of claim 1, further comprising:
    transmitting, with the billing server, a payment confirmation to a handset at the phone number after transmitting the charge request to the carrier server.

9. The method of claim 8, further comprising:
    transmitting, with the billing server, a transaction result through the merchant server to the handset for display by an application on the handset.

10. A non-transitory computer-readable medium having stored thereon a set of instructions wherein, when executed by a processor of a computer performs a method of processing transactions with a billing server, comprising:
    receiving, at the billing server, a configuration input from at least one merchant computer, the configuration input configuring a pricing matrix of countries and target prices, the pricing matrix having a set of cells, each cell corresponding to an intersection between a respective country and a respective target price, such that each country has a subset of the set of cells, the subset having a plurality of price points that are different from each other;
    storing, with the billing server, the pricing matrix;
    receiving, with the billing server, a pricing call from the merchant computer system;
    transmitting, with the billing server, the pricing matrix to the merchant computer in response to the pricing call;
    receiving, with the billing server, a payment authorization based on the price point;
    determining, with the billing server, a carrier server based on the payment authorization;
    sending, with the billing server, a charge request to the carrier server to charge an account on the carrier server corresponding to a phone number; and
    transmitting, with the billing server, a transaction callback notification to the merchant computer.

11. A billing server comprising:
    a processor;
    a non-transitory computer-readable medium connected to the processor; and
    a set of instructions on the computer-readable medium and executable by the processor, including:
    a transaction application programmable interface management module executing the steps of:
    receiving a configuration input from at least one merchant computer, the configuration input configuring a pricing matrix of countries and target prices, the pricing matrix having a set of cells, each cell corresponding to an intersection between a respective country and a respective target price, such that each country has a subset of the set of cells, the subset having a plurality of price points that are different from each other;
    storing the pricing matrix;
    receiving, with the billing server, a pricing call from the merchant computer system;
    transmitting the pricing matrix to the merchant computer in response to the pricing call; and
    a carrier billing module executing the steps of:
    receiving, with the billing server, a payment authorization based on one of the price points;
    determining, with the billing server, a carrier server based on the payment authorization;
    sending, with the billing server, a charge request to the carrier server to charge an account on the carrier server corresponding to phone number; and transmitting, with the billing server, a transaction callback notification to the merchant computer.

* * * * *